Jan. 22, 1957
A. PRESTER
2,778,240
GEAR CONSTRUCTION
Filed March 18, 1953
2 Sheets-Sheet 1
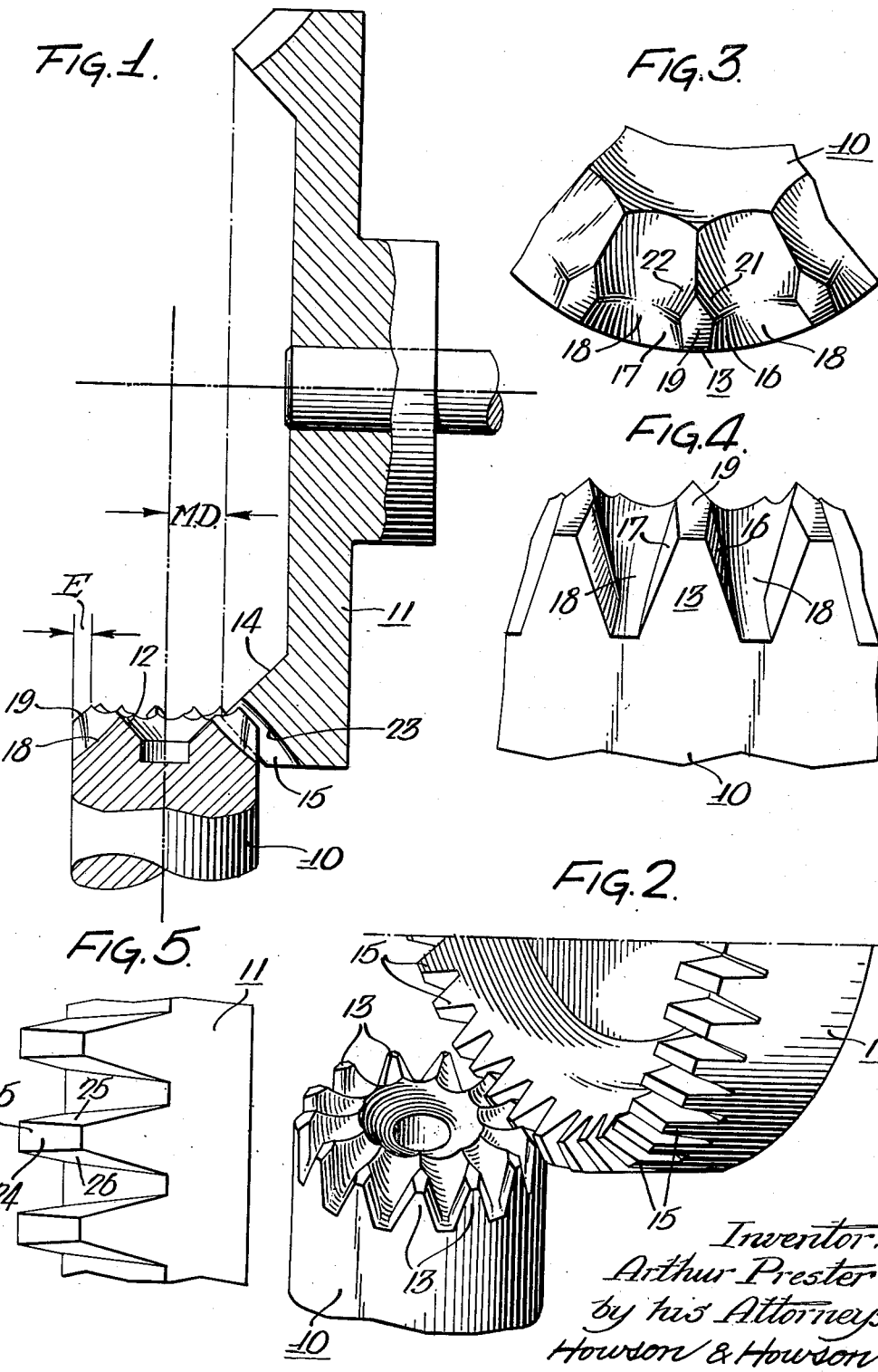

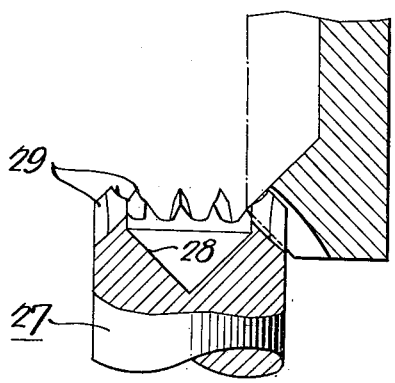
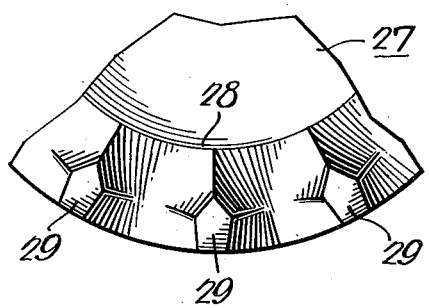
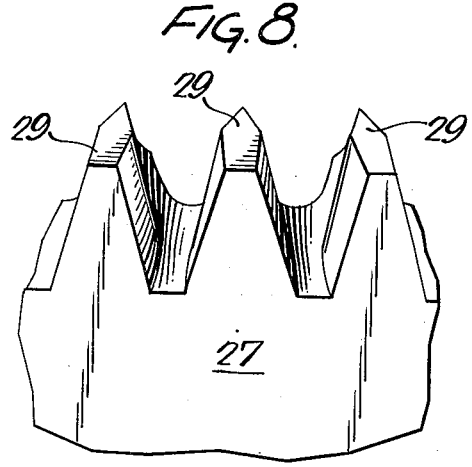
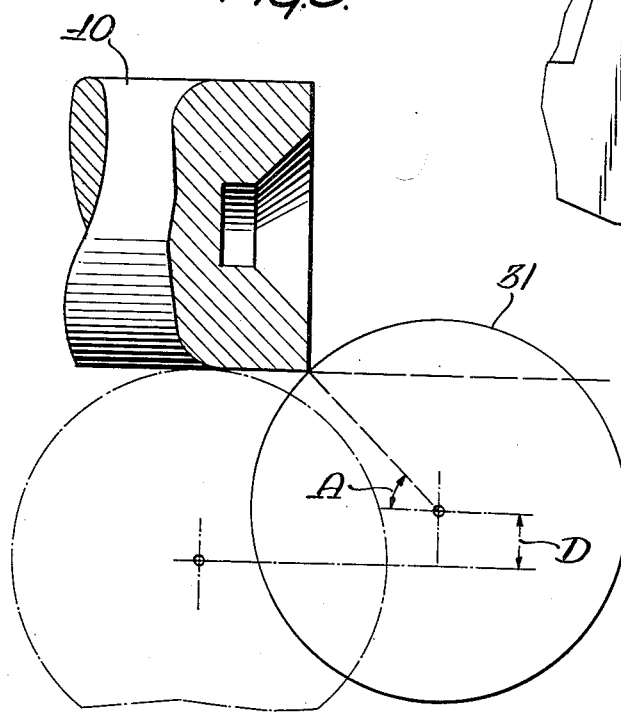

United States Patent Office 2,778,240
Patented Jan. 22, 1957

2,778,240

GEAR CONSTRUCTION

Arthur Prester, Philadelphia, Pa., assignor to Ocean City Manufacturing Company, Philadelphia, Pa., a corporation of Pennsylvania Application March 18, 1953, Serial No. 343,061

14 Claims. (Cl. 74—459.5)

The present invention relates to new and useful improvements in gears and the method of manufacturing and mounting the same and more particularly to gears of the type which mesh with their axes disposed in angular relationship.

Prior to the present invention there were two general types of gears which would mesh with their axes disposed in angular relationship. These are the crown gear and the bevel gear. Crown gears are generally used in cheap construction of toys and similar articles, are usually stamped from sheet metal, and may only be used to transmit relatively small forces. Bevel gears, on the other hand, are relatively expensive and very close tolerances must be maintained in the manufacture and mounting of the gears and thus bevel gears increase considerably the cost of an article on which they are used.

The present invention provides a novel gear which may be used in place of any bevel gear, but which may be manufactured with the ease and cheapness of spur gears. In addition, the gears of the present invention mesh in a manner similar to bevel gears, but there is no need to maintain extremely close tolerances when manufacturing and mounting the gears of the present invention. In order to form a gear according to the present invention, a gear blank is mounted in the chuck of a standard hobbing machine for rotary movement about its longitudinal axis. A standard spur gear hob is mounted in the hobbing machine for rotary movement about an axis spaced from the axis of the blank and disposed at right angles thereto. The hob cuts into the edge of the gear blank a greater distance than the usual distance for spur gears and forms teeth around the periphery of one end of the gear blank. By this process, a gear adapted to mesh in rolling contact with another gear disposed in angular relationship thereto may be completely formed in approximately one minute as compared to the minimum of approximately twenty minutes required for forming a bevel gear on the usual bevel gear milling machine.

With the foregoing in mind, the principal object of the present invention is to provide a gear having a novel tooth formation which may be used to replace bevel gears.

Another object of the present invention is to provide a novel method of manufacturing gears operable to engage one another with their axes angularly disposed on a standard spur gear hobbing machine.

A still further object of the present invention is to provide a novel gear of the type described which does not require extremely close tolerances in the manufacture and mounting of the gears, which can be manufactured easily and cheaply and is entirely efficient and effective in operation and use.

These and other objects of the present invention and the various features and details of the operation and construction thereof are hereinafter more fully set forth and described with reference to the accompanying drawings, in which:

Fig. 1 is a longitudinal sectional view of a gear and pinion made in accordance with the present invention;

Fig. 2 is a perspective view of the gear and pinion shown in Fig. 1 illustrating the formation of the teeth of the gear and pinion and the manner in which the teeth mesh;

Fig. 3 is a fragmentary face view of the pinion shown in Fig. 1 illustrating the tooth formation;

Fig. 4 is a fragmentary side elevational view of the pinion illustrated in Fig. 1;

Fig. 5 is a fragmentary side elevational view of the gear illustrated in Fig. 1 showing the tooth formation;

Fig. 6 is a longitudinal sectional view of a modified form of a gear and pinion of the present invention;

Fig. 7 is a face view of the pinion illustrated in Fig. 6 showing the tooth formation;

Fig. 8 is a fragmentary side elevational view of the pinion illustrated in Fig. 6; and Fig. 9 is a longitudinal sectional view of a blank for a pinion or gear illustrating the method of setting the hob for cutting the teeth of the pinion and gear.

Referring more specifically to the drawing and particularly Fig. 1 thereof, reference numeral 10 designates generally a pinion made in accordance with the present invention mounted in meshing relationship with a gear 11, the axis of which is disposed in angular relationship to the axis of the pinion. The face of the pinion is undercut as indicated at 12 and a plurality of teeth 13 extend inwardly from the outer peripheral surface of the pinion and terminate at the undercut portion of the pinion. The gear 11 is also formed in a manner similar to the pinion 10 and has an undercut portion centrally thereof as indicated at 14. A plurality of teeth 15 extend inwardly from the outer peripheral surface of the gear 11 and terminate at the undercut portion 14 of the gear.

An important feature of the present invention resides in the particular shape or formation of the teeth of both the pinion and the gear. With reference to Figs. 1, 3, and 4 which illustrate the formation of the pinion teeth 13, each pinion tooth comprises opposite working faces 16 and 17, a root portion 18 and an outer tooth surface 19. The root portion 18 of the tooth is generally arcuate in shape and is formed about a radius which extends outwardly from the edges of the pinion at substantially 45° to the axis of the pinion. The outer tooth surface 19 of the pinion is flat and substantially parallel to a tangent drawn to the central portion of the arcuate root 18. This configuration of the root and tooth surface, particularly the root, holds true for any diameter of the pinion and thus it is only in rare instances that a tangent drawn to the center of the root will come anywhere close to the intersection of the axes of the pinion and gear. The working faces 16 and 17 of the teeth 13 are equally disposed on opposite sides of each tooth and converge inwardly toward each other as they approach the tooth surface 19. In addition, the opposite working faces of the teeth are parallel to each other along any plane parallel to the root of the tooth so that, in fact, the teeth actually extend out from the pinion substantially perpendicular to the root of the tooth. The faces 16 and 17 of the teeth terminate inwardly of the gear in undercut or inwardly beveled portions 21 and 22, respectively, to provide at least as much of a cutout portion at the rear of the tooth as there is between the working faces of adjacent teeth.

The formation of the gear teeth is substantially similar to the formation of the teeth on the smaller pinion and each gear tooth 15 comprises an arcuate roof 23 cut about a radius extending substantially at a 45° angle to the axis of the gear, a tooth surface 24 and oppositely disposed working surfaces 25 and 26. The working surfaces 25 and 26 of the gear are formed similar to the working surfaces 16 and 17 of the pinion. However, because of the greater diameter of the gear and the lesser amount of convergence between the working faces of adjacent teeth, the rear edges of the teeth do not have to be undercut or beveled inwardly in a manner similar to the teeth of the pinion. This would also hold true in the pinion construction if the pinion is of sufficiently large diameter.

Figs. 6, 7, and 8 illustrate a modified form of a pinion 27 wherein the pinion blank is undercut as indicated at 28 to a considerably greater extent than the undercut 12 of the above described pinion 10. Teeth 29 are provided about the end of the pinion 27 and mesh with teeth on a gear similar to the above described gear 11. The teeth are formed exactly the same as the teeth 13 of the pinion 10 and terminate in the undercut portion 28 as illustrated in Fig. 7. The working surfaces of the teeth 29 are exactly the same as the working surfaces 16 and 17 of the teeth 13, but the radial length of the teeth 29 is considerably less than that of the teeth 13. This construction provides a more definite shaped tooth which is slightly weaker than the teeth of the pinion 10. If desired, both the pinion and gear may be undercut to a greater extent than that illustrated in the drawings or alternatively the pinion and gear do not have to be undercut at all.

Another very important feature of the present invention resides in the method of manufacturing the gears and pinions of the present invention and also in the formula used for setting the machine on which the gears are cut. The gears are cut on a standard spur gear hobbing machine with a standard spur gear hob which is set in a manner considerably different from the setting of the hob for cutting spur gears. With reference to Fig. 9, the pinion or gear blank is mounted in the chuck of a hobbing machine (not shown) for rotary movement about its longitudinal axis and a hob 31 having usual cutting teeth thereon is mounted for rotary movement about an axis spaced from the axis of the gear or pinion blank and extending at right angles thereto. The outer edge of the hob is displaced radially inward of the blank mounted in the chuck of the hobbing machine a predetermined distance and the pinion or gear blank and hob are both rotated about their respective axis while the hob is moved longitudinally of the blank a predetermined amount to cut the teeth thereon.

The inward radial displacement of the hob from a point tangent to the side edge of the hob to the cutting position of the hob is indicated as D in Fig. 9 and is determined in such a manner that the radius of the hob drawn to the peripheral edge of the hob at the point where the hob initially touches the blank is disposed at a predetermined angle A to the longitudinal axis of the blank. It has been found that the ideal angle between this radius and the axis of the blank should be approximately 45° and thus the displacement D will equal the radius of the gear blank minus the radius of the blank times the sine of the angle A between the above described radius of the hob and the axis of the blank. For example, when it is desired to have the angle A equal 45° and a blank with a diameter of $$1'' \ D = .500 - (.500 \times .70711) = .147''$$

After the hob has been displaced radially inward of the blank the desired predetermined distance, the blank and hob are rotated and the hob is moved longitudinally of the blank to cut the teeth therein. This entire cutting process for a gear made in accordance with the present invention takes approximately one minute. This is to be compared with the approximately 20 minute cutting time of a bevel gear which serves substantially the same purpose as the gears of the present invention and thus it is obvious that a gear manufactured in accordance with the present invention is substantially cheaper than a bevel gear of the same size.

Still another important feature of the present invention is the method of mounting the gear and pinion made in accordance with the present invention so that they mesh properly. The mounting distance from the center of the pinion to the forward face of the gear, indicated as M. D. in Fig. 1, equals the outside diameter of the pinion divided by two plus the desired radial clearance minus the radial length of the gear tooth, which is indicated as E in Fig. 1. Taking, for example, a pinion having 17 teeth and a diametral pitch of 32, the outside diameter of the pinion would be equal to the number of teeth plus 2 divided by the diametral pitch or, $$\frac{17+2}{32} = .59375$$

The radial length of this gear tooth which equals E is the working depth of the tooth found from spur gear tables for a particular diametral pitch divided by the sine of the angle A, and in the example given $$E = \frac{.0625}{.70711} = .0883$$

Thus the mounting distance $$(\text{M.D.}) = \frac{.59375}{2} + .003 - .0883 = .212''$$

The mounting distance of the face of the pinion from the longitudinal axis of the gear may also be found by using the formula set forth above.

From the foregoing, it is apparent that the present invention provides a gear having a novel tooth construction which may be used to replace bevel gears. In addition, the present invention provides a novel method of manufacturing and mounting gears operable to engage one another with their axes angularly disposed.

While particular embodiments of the present invention have been illustrated and described herein, it is not intended to limit the invention to such a disclosure and changes and modifications may be incorporated and embodied therein within the scope of following claims.

I claim:

1. In a gear having a plurality of teeth formed in one end surface thereof, an intermediate surface of concave arcuate form between adjacent tooth root portions facing obliquely outwardly, and oppositely disposed working surfaces on each tooth projecting upwardly from said tooth root portion thereof and converging inwardly toward each other, an imaginary line on one working surface of a tooth parallel to and spaced a predetermined distance from the intermediate surface adjacent said one working surface being parallel to an imaginary line on the other working surface of the tooth parallel to and spaced said predetermined distance from the intermediate surface adjacent said other working surface.

2. In a gear having a plurality of teeth formed in one end surface thereof, an intermediate surface of concave arcuate form between adjacent tooth root portions facing obliquely outwardly, oppositely disposed working surfaces on each tooth projecting upwardly from the tooth root portion thereof and converging inwardly toward each other, and said working surfaces terminating inwardly of the end surface of the gear in inwardly converging surfaces to provide clearance between the inner ends of the gear teeth.

3. In a gear having a plurality of teeth formed in one end surface thereof, an intermediate surface of concave arcuate form between adjacent tooth root portions facing obliquely outwardly at an acuate angle to the axis of rotation of the gear, oppositely disposed working surfaces on each tooth projecting upwardly from the tooth root portion thereof and converging inwardly toward each other, an imaginary line on one working surface of a tooth parallel to and spaced a predetermined distance from the intermediate surface adjacent said one working surface being parallel to an imaginary line on the other working surface of the tooth parallel to and spaced said predetermined distance from the intermediate surface adjacent said other working surface, said working surfaces terminating inwardly of the end surface of the gear in inwardly converging surfaces to provide clearance between the inner ends of the gear teeth.

4. In a gear having a plurality of teeth formed in one end surface thereof, an intermediate surface of concave arcuate form between adjacent tooth portions facing obliquely outwardly and having a radius described from a center located outwardly of the perimeter of the gear and forwardly of the end surface, and oppositely disposed working surfaces on each tooth projecting upwardly from the tooth root portion thereof and converging inwardly toward each other, an imaginary line on one working surface of a tooth parallel to and spaced a predetermined distance from the intermediate surface adjacent said one working surface being parallel to an imaginary line on the other working surface of the tooth parallel to and spaced said predetermined distance from the intermediate surface adjacent said other working surface.

5. In a gear having a plurality of teeth formed in one end surface thereof, an intermediate surface of concave arcuate form between adjacent tooth root portions facing obliquely outwardly and having a radius described from a center located outwardly of the perimeter of the gear and forwardly of the end surface on an imaginary line diverging at an acute angle to the axis of rotation of the gear, and oppositely disposed working surfaces on each tooth projecting upwardly from the tooth root portion thereof and converging inwardly toward each other, an imaginary line on one working surface of a tooth parallel to and spaced a predetermined distance from the intermediate surface adjacent said one working surface being parallel to an imaginary line on the other working surface of the tooth parallel to and spaced said predetermined distance from the intermediate surface adjacent said other working surface.

6. In a gear having a plurality of teeth formed in one end surface thereof, an intermediate surface of concave arcuate form between adjacent tooth root portions facing obliquely outwardly and having a radius described from a center located outwardly of the perimeter of the gear and forwardly of the end surface on an imaginary line diverging at substantially a 45° angle to the axis of rotation of the gear, oppositely disposed working surfaces on each tooth projecting upwardly from the tooth root portion thereof and converging inwardly toward each other, an imaginary line on one working surface of a tooth parallel to and spaced a predetermined distance from the intermediate surface adjacent said one working surface being parallel to an imaginary line on the other working surface of the tooth parallel to and spaced said predetermined distance from the intermediate surface adjacent said other working surface, and said working surfaces terminating inwardly of the end surface of the gear in inwardly converging surfaces to provide clearance between the inner ends of the gear teeth.

7. A pair of gears operable to engage one another with their axes of rotation angularly disposed comprising a pinion and gear each having a plurality of teeth formed peripherally of one end surface, an intermediate surface of concave arcuate form between adjacent pinion tooth root portions facing obliquely outwardly and having a predetermined radius, an intermediate surface of concave arcuate form between adjacent gear tooth root portions facing obliquely outwardly and having a predetermined radius, the radius of the intermediate surface of the pinion being substantially equal to the radius of the intermediate surface of the gear, and oppositely disposed working surfaces on each tooth projecting upwardly from the root of the tooth and converging inwardly toward each other.

8. A pair of gears operable to engage one another with their axes of rotation angularly disposed comprising a pinion and gear each having a plurality of teeth formed peripherally of one end surface, an intermediate surface of concave arcuate form between adjacent pinion tooth root portions facing obliquely outwardly and having a radius described from a center located outwardly of the perimeter of the pinion and forwardly of the end surface thereof on an imaginary line diverging at an acute angle to the axis of rotation of the pinion, an intermediate surface of concave arcuate form between adjacent gear tooth root portions facing obliquely outwardly and having a radius described from a center located outwardly of the perimeter of the gear and forwardly of the end surface thereof on an imaginary line diverging at an acute angle to the axis of rotation of the gear, the radius of the intermediate surface of the pinion root being substantially equal to the radius of the intermediate surface of the gear root, and oppositely disposed working surfaces on each tooth projecting upwardly from the root of the tooth and converging inwardly toward each other.

9. A pair of gears operable to engage one another with their axes of rotation disposed substantially at right angles comprising a pinion and gear each having a plurality of teeth formed peripherally of one end surface, an intermediate surface of concave arcuate form between adjacent pinion tooth root portions facing obliquely outwardly and having a radius described from a center located outwardly of the perimeter of the pinion and forwardly of the end surface thereof on an imaginary line diverging at substantially a 45° angle to the axis of rotation of the pinion, an intermediate surface of concave arcuate form between adjacent gear tooth portions facing obliquely outwardly and having a radius described from a center located outwardly of the perimeter of the gear and forwardly of the end surface thereof on an imaginary line diverging at substantially a 45° angle to the axis of rotation of the gear, the radius of the intermediate surface of the pinion being substantially equal to the radius of the intermediate surface of the gear, and oppositely disposed working surfaces on each tooth projecting upwardly from the root of the tooth and converging inwardly toward each other.

10. A pair of gears operable to engage one another with their axes of rotation angularly disposed comprising a pinion and gear each having a plurality of teeth formed peripherally of one end surface, an intermediate surface of concave arcuate form between adjacent pinion tooth root portions facing obliquely outwardly and having a predetermined radius, an intermediate surface of concave arcuate form between adjacent gear tooth root portions facing obliquely outwardly and having a predetermined radius, the radius of the intermediate surface of the pinion being substantially equal to the radius of the intermediate surface of the gear, and oppositely disposed working surfaces on each tooth projecting upwardly from the root of the tooth and converging inwardly toward each other, an imaginary line on one working surface of a tooth parallel to and spaced a predetermined distance from the intermediate surface adjacent said one working surface being parallel to an imaginary line on the other working surface of the tooth parallel to and spaced said predetermined distance from the intermediate surface adjacent said other working surface.

11. A pair of gears operable to engage on another with their axes of rotation angularly disposed comprising a pinion and gear each having a plurality of teeth formed peripherally of one end surface, an intermediate surface of concave arcuate form between adjacent pinion tooth root portions facing obliquely outwardly and having a radius described from a center located outwardly of the perimeter of the pinion and forwardly of the end surface thereof on an imaginary line diverging at an angle to the axis of rotation of the pinion, an intermediate surface of concave arcuate form between adjacent gear tooth root portions facing obliquely outwardly and having a radius described from a center located outwardly of the perimeter of the gear and forwardly of the end surface thereof on an imaginary line diverging at an acute angle to the axis of rotation of the gear, the radius of the intermediate surface of the pinion being substantially equal to the radius of the intermediate surface of the gear, and oppositely disposed working surfaces on each tooth projecting upwardly from the root of the tooth and converging inwardly toward each other, an imaginary line on one working surface of a tooth parallel to and spaced a predetermined distance from the intermediate surface adjacent said one working surface being parallel to an imaginary line on the other working surface of the tooth parallel to and spaced said predetermined distance from the intermediate surface adjacent said other working surface.

12. A pair of gears operable to engage one another with their axes of rotation disposed substantially at right angles comprising a pinion and gear each having a plurality of teeth formed peripherally of one end surface, an intermediate surface of concave arcuate form between adjacent pinion tooth root portions facing obliquely outwardly and having a radius described from a center located outwardly of the perimeter of the pinion and forwardly of the end surface thereof on an imaginary line diverging at substantially a 45° angle to the axis of rotation of the pinion, an intermediate surface of concave arcuate form between adjacent gear tooth root portions facing obliquely outwardly and having a radius described from a center located outwardly of the perimeter of the gear and forwardly of the end surface thereof on an imaginary line diverging at substantially a 45° angle to the axis of rotation of the gear, the radius of the intermediate surface of the pinion being substantially equal to the radius of the intermediate surface of the gear, oppositely disposed working surfaces on each tooth projecting upwardly from the root of the tooth and converging inwardly toward each other, an imaginary line on one working surface of a tooth parallel to and spaced a predetermined distance from the intermediate surface adjacent said one working surface being parallel to an imaginary line on the other working surface of the tooth parallel to and spaced said predetermined distance from the intermediate surface adjacent said other working surface, the working surfaces of the pinion teeth terminating inwardly of the periphery of the pinion in inwardly converging surfaces to provide clearance between the inner ends of the pinion teeth.

13. A set of gears operable to engage one another with their axis of rotation angularly disposed comprising a pinion and gear each having a plurality of teeth of predetermined radial length peripherally of one end surface; said gear and pinion being mounted with a predetermined radial clearance between engaging teeth, the mounting distance between the axis of rotation of the pinion and the end surface of the gear being equal to the outside diameter of the gear divided by two plus the radial clearance minus the radial length of the pinion teeth.

14. A set of gears operable to engage one another with their axis of rotation disposed at right angles comprising a pinion and gear each having a plurality of teeth of predetermined radial length peripherally of one end surface; said gear and pinion being mounted with a predetermined radial clearance between engaging teeth, the mounting distance between the axis of rotation of the pinion and the end surface of the gear being equal to the outside diameter of the pinion divided by two plus the radial clearance minus the radial length of the pinion teeth, and the mounting distance between the axis of rotation of the gear and the end surface of the pinion being equal to the outside diameter of the gear divided by two plus the radial clearance minus the radial length of the gear teeth.

References Cited in the file of this patent
UNITED STATES PATENTS

| | | |
|---|---|---|
| 600,994 | See | Nov. 22, 1898 |
| 1,285,870 | Wingquist | Nov. 26, 1918 |
| 1,685,441 | Wildhaber | Sept. 25, 1928 |